US012430886B2

(12) United States Patent
Karoum et al.

(10) Patent No.: US 12,430,886 B2
(45) Date of Patent: Sep. 30, 2025

(54) AUTOMATED IDENTIFICATION AND QUANTIFICATION OF SOLID DRILLING FLUID ADDITIVES

(71) Applicant: Schlumberger Technology Corporation, Sugar Land, TX (US)

(72) Inventors: Reda Karoum, Houston, TX (US); Steven Young, Cypress, TX (US); Karim Bondabou, Montpellier (FR); Maneesh Pisharat, Aberdeen (GB); Tetsushi Yamada, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 361 days.

(21) Appl. No.: 18/050,873

(22) Filed: Oct. 28, 2022

(65) Prior Publication Data
US 2024/0144647 A1    May 2, 2024

(51) Int. Cl.
*G06V 10/764*    (2022.01)
*E21B 21/06*    (2006.01)
(Continued)

(52) U.S. Cl.
CPC .......... *G06V 10/764* (2022.01); *E21B 21/065* (2013.01); *E21B 49/003* (2013.01);
(Continued)

(58) Field of Classification Search
CPC ...... G06V 10/764; G06V 10/26; G06V 10/54; G06V 10/56; G06V 10/774; G06V 10/776;
(Continued)

(56) References Cited

U.S. PATENT DOCUMENTS 5,686,724 A    11/1997 Spilker
6,729,400 B2    5/2004 Mullins
(Continued)

FOREIGN PATENT DOCUMENTS

WO    2016108813 A1    7/2016
WO    2021126866 A1    6/2021

OTHER PUBLICATIONS

Du, X. et al., "The Embedded VGG-Net Video Stream Processing Framework for Real-Time Classification of Cutting Volume at Shale Shaker", IPTC-19312-MS, presented at the International Petroleum Technology Conference, Beijing, China, 2019, 9 pages.
(Continued)

*Primary Examiner* — Stephen R Koziol
*Assistant Examiner* — Dylan J Sherrillo
(74) *Attorney, Agent, or Firm* — Jeffrey D. Frantz

(57) ABSTRACT

A method for evaluating solid drilling fluid additives such as lost cuttings materials (LCM) includes acquiring a calibrated digital image of solid particles separated from drilling fluid circulating in a wellbore. The calibrated digital image is processed to identify individual ones of the solid particles depicted in the image. Color features and/or texture features are extracted from the identified solid particles depicted in the image. The extracted color and/or texture features are processed to identify LCM particles among the identified solid particles and to classify each of the identified LCM particles into one of a plurality of LCM classes and thereby obtain an LCM particle classification.

20 Claims, 6 Drawing Sheets

(51) Int. Cl.
| | |
|---|---|
| *E21B 49/00* | (2006.01) |
| *G06V 10/26* | (2022.01) |
| *G06V 10/54* | (2022.01) |
| *G06V 10/56* | (2022.01) |
| *G06V 10/774* | (2022.01) |
| *G06V 10/776* | (2022.01) |
| *G06V 10/82* | (2022.01) |

(52) U.S. Cl.
CPC .............. *G06V 10/26* (2022.01); *G06V 10/54* (2022.01); *G06V 10/56* (2022.01); *G06V 10/774* (2022.01); *G06V 10/776* (2022.01); *G06V 10/82* (2022.01)

(58) Field of Classification Search
CPC ..... G06V 10/82; E21B 21/065; E21B 49/003; E21B 21/003; E21B 21/01
See application file for complete search history.

(56) References Cited

U.S. PATENT DOCUMENTS

| | | | |
|---|---|---|---|
| 8,347,871 B2 | 1/2013 | Irvine | |
| 10,047,604 B2 | 8/2018 | Graves | |
| 10,151,677 B2 * | 12/2018 | Kulkarni | ................. E21B 49/02 |
| 10,761,003 B2 | 9/2020 | Francois | |
| 10,781,692 B2 | 9/2020 | Francois | |
| 11,443,149 B2 | 9/2022 | Francois | |
| 11,530,998 B2 * | 12/2022 | Sungkorn | ............ G01V 11/002 |
| 11,688,172 B2 * | 6/2023 | Ruel | ....................... E21B 44/00 |
| | | | 382/103 |
| 2012/0134559 A1 | 5/2012 | Suzuki | |
| 2017/0191919 A1 | 7/2017 | Kulkarni | |
| 2017/0356290 A1 | 12/2017 | Dmitry | |
| 2018/0120740 A1 | 5/2018 | Ukai | |
| 2019/0360326 A1 | 11/2019 | Deville | |
| 2021/0108511 A1 | 4/2021 | Androvandi | |
| 2021/0248428 A1 | 8/2021 | Sharma | |
| 2022/0237891 A1 * | 7/2022 | Xu | ........................ E21B 47/002 |
| 2023/0184992 A1 * | 6/2023 | Albahrani | ............ E21B 49/005 |
| | | | 175/24 |
| 2023/0220761 A1 | 7/2023 | Yamada | |
| 2024/0263553 A1 * | 8/2024 | Holt | ...................... E21B 47/022 |

OTHER PUBLICATIONS

Marana, A. N. et al., "An Intelligent System to Detect Drilling Problems Through Drilled Cuttings Return Analysis", IADC/SPE 128916, presented at the IADC/SPE Drilling Conference and Exhibition held in New Orleans, Louisiana, USA, 2010, 8 pages.
Kathrada, M. et al., "Visual Recognition of Drill Cuttings Lithologies Using Convolutional Neural Networks to Aid Reservoir Characterisation", 2019 Reservoir Characterisation and Simulation Conference and Exhibition, Abu Dhabi, UAE, 11 pages.
CLEAR Service, downloaded from the internet on Dec. 7, 2022 at [https://www.slb.com/drilling/surface-and-downhole-logging/mud-logging-services/clear-wellbore-risk-reduction-service], 2015, 2 pages.
Hodder at el., "Obtaining Formation Water Chemistry Using a Mud Tracer and For-mation Tester in a North Sea Subsea Field Development", SPE 88637 MS, Paper presented at the SPE Asia Pacific Oil and Gas Conference and Exhibition, Oct. 18-20, 2004, 10 pages.
Zhou et al., Reservoir Geomechanic Heterogeneity Index (RGHI): concept, methodology and application, SPE/AAPG/SEG Unconventional Resources Technology, URTEC-2902828-MS, Paper presented at the SPE/AAPG/SEG Unconventional Resources Technology Conference, Jul. 23-25, 2018, 9 pages.
Aghlli et al., Reservoir heterogeneity and fracture parameter determination using electrical image logs and petrophysical data (a case study, carbonate Asmari formation, Zagros Basin, SW Iran), Petroleum Science, vol. 17, Issue 1, pp. 51-691 Feb. 2020, 19, pages.
International Search Report and Written Opinion of PCT Application No. PCT/US2023/036117 dated Feb. 20, 2024, 12 pages.
Zhang et al., Dielectric Response of Carbonate Core-plugs—Influence of Heterogeneous Rock Properties on Permittivity, SPE-136941-MS, Paper presented at the SPE/DGS Saudi Arabia Section Technical Symposium and Exhibition, Apr. 4-7, 2010, 16 pages.
Harami et al., Heterogeneity Index and fast screening processes used in a large mature field designed for quick production gains, SSPE-167350-MS, Paper presented at the SPE Kuwait Oil and Gas Show and Conference, Oct. 8-10, 2013, 15 pages.
Salman et al., Analyzing completion efficiency using modified heterogeneity index, SPE-166227-MS, Paper presented at the SPE Annual Technical Conference and Exhibition, Sep. 30-Oct. 2, 2013.
Variogram Wikipedia article downloaded from https://en.wikipedia.org/wiki/Variogram. Downloaded on or before Jul. 3, 2020.

* cited by examiner

AUTOMATED IDENTIFICATION AND QUANTIFICATION OF SOLID DRILLING FLUID ADDITIVES

CROSS REFERENCE TO RELATED APPLICATIONS

None.

BACKGROUND

In subterranean drilling operations, solid drilling fluid additives are commonly added to the drilling fluid. For example, lost circulation materials (LCM) are commonly added to drilling fluid to seal loss regions and prevent the fluid from flowing into the formation. The LCM may include low-cost waste products from various industries, for example, including ground nut shells, mica, ground rubber, and various polymeric materials.

During a drilling operation, circulating drilling fluid is commonly evaluated at the surface for LCM. For example, the circulating fluid may be evaluated to identify the type(s) and amount(s) of LCM materials therein. This fluid evaluation may aid in optimizing the drilling fluid/LCM formulation and may further provide information about the structure of the wellbore wall/formation including fractures and vugs.

One difficulty with the above drilling fluid evaluation is that it can be particularly time consuming and labor intensive. It is commonly necessary to isolate LCM in the fluid (e.g., via screening the returning fluid). LCM particles may then be manually identified, counted, and characterized. There is a need in the industry for improved methods that automate or partially automate the above LCM evaluation processes.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

A method for evaluating solid drilling fluid additives such as lost cuttings materials (LCM) is disclosed. The method includes acquiring a calibrated digital image of solid particles separated from drilling fluid circulating in a wellbore in which the solid particles include at least LCM particles. The calibrated digital image is processed to identify individual ones of the solid particles depicted in the image. Color features and/or texture features are extracted from the identified solid particles depicted in the image. The extracted color and/or texture features are processed to identify LCM particles among the identified solid particles and to classify each of the identified LCM particles into one of a plurality of LCM classes and thereby obtain an LCM particle classification. The LCM classification may be further processed to generate a consolidated summary.

Figure 1:
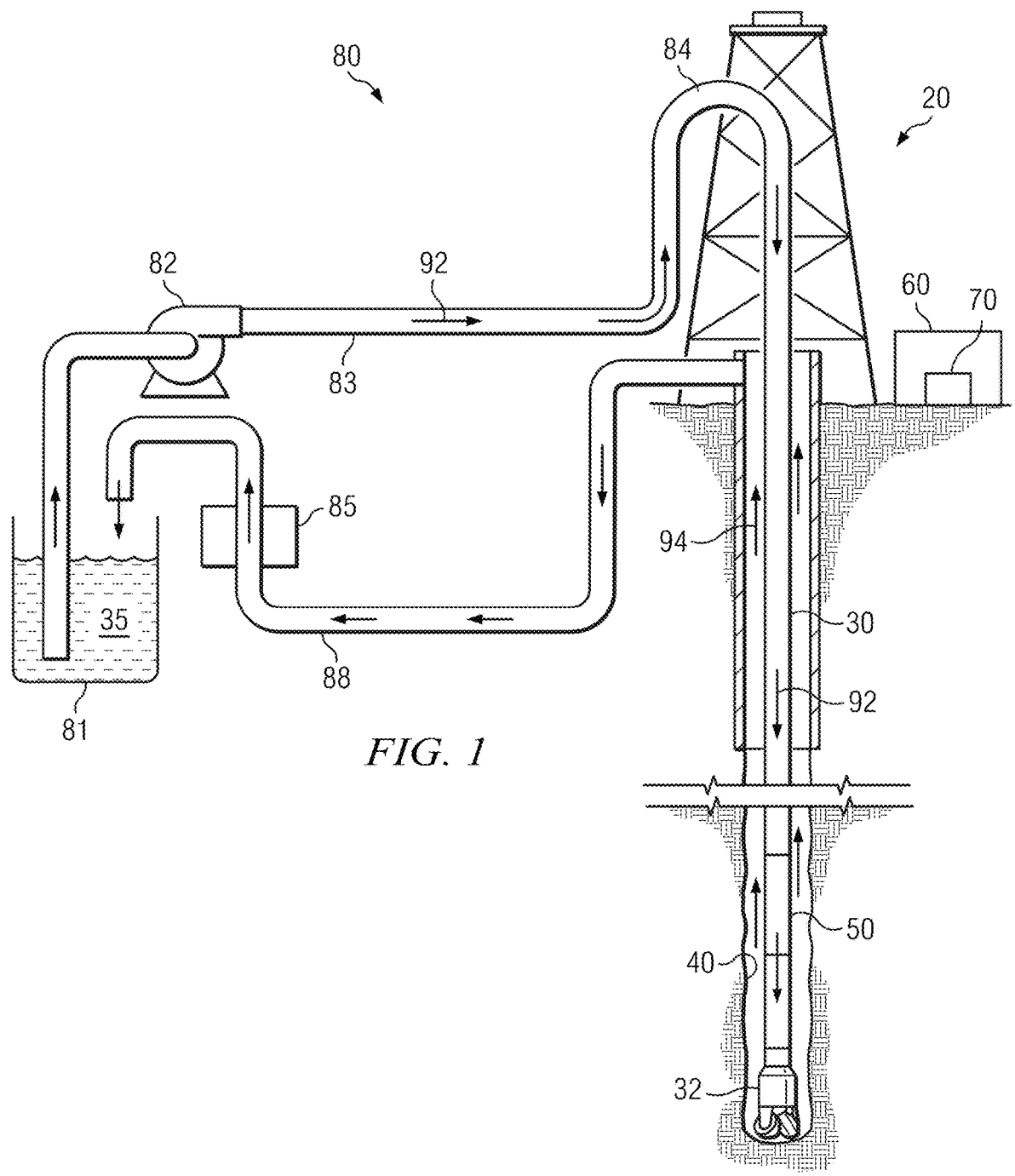
FIG. 1 depicts an example drilling rig including a system for evaluating LCM in circulating drilling fluid.

FIG. 1 depicts an example drilling rig 20 including a system 70 for automatically evaluating solid drilling fluid additives, such as LCM, in drilling fluid. The rig 20 may be positioned over a subterranean formation (not shown). The rig 20 may include, for example, a derrick and a hoisting apparatus (also not shown) for raising and lowering a drill string 30, which, as shown, extends into wellbore 40 and includes, for example, a drill bit 32 and one or more downhole measurement tools 50 (e.g., a logging while drilling tool and/or a measurement while drilling tool).

Drilling rig 20 further includes a surface system 80 for controlling the flow of drilling fluid used on the rig (e.g., used in drilling the wellbore 40). In the example rig depicted, drilling fluid 35 is pumped downhole (as depicted at 92) via a mud pump 82. The drilling fluid 35 may be pumped, for example, through a standpipe 83 and mud hose 84 in route to the drill string 30. The drilling fluid typically emerges from the drill string 30 at or near the drill bit 32 and creates an upward flow 94 of mud through the wellbore annulus (the annular space between the drill string and the wellbore wall). The drilling fluid then flows through a return conduit 88 and solids control equipment 85 (such as a shale shaker) to a mud pit 81. It will be appreciated that the terms drilling fluid and mud are used synonymously herein.

As is known to those of ordinary skill in the art, LCM are sometimes added to circulating drilling fluid to seal loss regions and prevent drilling fluid from flowing (and being lost) into the formation. The LCM may include low-cost waste products from various industries, for example, including ground nut shells, mica, ground rubber, and various polymeric materials. LCM particles are commonly sized and shaped to seal cracks and vugs in the wellbore wall and to flow through the drill bit jets without plugging the jets or significantly constricting fluid flow. Circulating LCM particles are transported to the surface in the upward flow 94 of drilling fluid and may be removed (or partially removed) from the fluid at the shale shakers or depending on their density, size, and shape may pass through the solids control equipment 85 to a mud tank (e.g., mud pit 81), such as a return tank and an active tank, before being recirculated downhole again.

The rig 20 may include a system 70 configured to automatically evaluate LCM images as described in greater detail herein. The system 70 may be deployed at the rig site (e.g., in an onsite laboratory 60) or offsite. The disclosed embodiments are not limited in this regard. The system 70 may include computer hardware and software configured to automatically or semi-automatically evaluate LCM images. To perform these functions, the hardware may include one or more processors (e.g., microprocessors) which may be connected to one or more data storage devices (e.g., hard drives or solid-state memory). As is known to those of ordinary skill, the processors may be further connected to a network, e.g., to receive the images from a networked camera system (not shown) or another compute system. It will, of course, be understood that the disclosed embodiments are not limited the use of or the configuration of any particular computer hardware and/or software.

While FIG. 1 depicts a land rig 20, it will be appreciated that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards.

Figure 2:
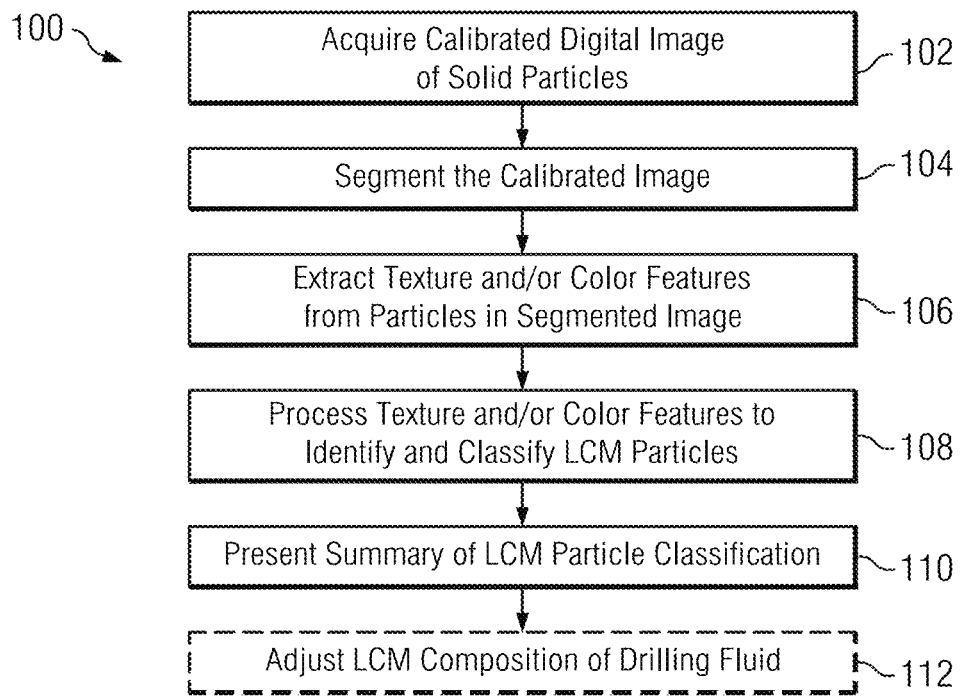
FIG. 2 depicts a flow chart of an example method for automatically characterizing LCM particles in drilling fluid.

FIG. 2 depicts a flow chart of one example method 100 for automatically characterizing LCM in drilling fluid. It will be appreciated that as used herein the term LCM may refer to substantially any solid drilling fluid additive particles. The method includes acquiring at least one calibrated digital image of solid particles separated from the drilling fluid at 102. The particles may include, for example, rock cuttings and/or solid LCM particles. The calibrated digital image may be processed with a segmenting algorithm to obtain segmented images at 104. The segmenting algorithm may be configured, for example, to identify individual particles (e.g., cuttings particles and LCM particles) in the calibrated images. The segmented image may be processed at 106 to extract texture and/or color features from one or more of the identified particles in the segmented image. For example, the image may be evaluated particle by particle to extract the color and texture features thereof. The extracted color and/or texture features may be processed at 108 to identify (or distinguish) LCM particles from among the other non-LCM identified particles (such as cuttings particles). The extracted color and/or texture features may be further processed at 108 to classify each of the identified LCM particles into one of a plurality of LCM classes to obtain an LCM classification of the image (and the drilling fluid). By classifying it may be meant that the identified LCM particles are distributed into groups having common features representative of individual types of LCM particle (e.g., nut plugs, calcite, cellulose, petroleum coke, polymeric beads, etc.).

With continued reference to FIG. 2, the identified LCM particles and/or the LCM classification may be further processed at 110 to generate and present a consolidate summary of the solid additive particles (e.g., LCM particles) in the drilling fluid. The summary may include, for example, the total amount (e.g., concentration) of LCM in the drilling fluid and/or the type and relative amount of each LCM particle type in the drilling fluid. In example embodiments, processing the calibrated digital image at 104, extracting color features or texture features at 106, processing the extracted color features or texture features at 108, and generating/presenting a consolidated summary at 110 may be performed automatically without human intervention. Method 100 may further optionally include adjusting the LCM composition of the fluid at 112 based on the consolidated summary, for example, by adding additional LCM to the drilling fluid prior to recirculating the fluid downhole.

Figure 3:
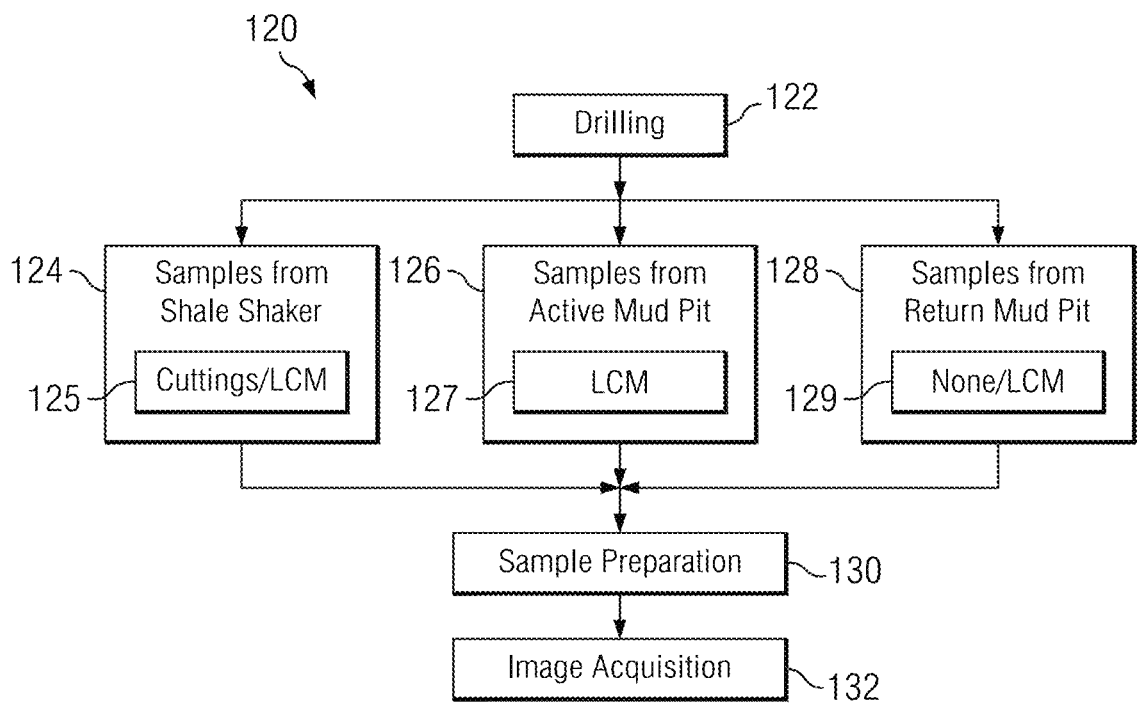
FIG. 3 depicts example methods for acquiring digital images of LCM particles.

Turning now to FIG. 3, one example method 120 for separating the LCM from the drilling fluid and acquiring digital images at 102 of FIG. 2 is depicted. A borehole is drilled at 122, for example, using the example rig 20 described above with respect to FIG. 1. LCM are circulated in the drilling fluid while drilling. The LCM and the rock cuttings generated while drilling are transported to the surface in the upwardly flowing drilling fluid (at 94 in FIG. 1). In the example embodiment depicted, LCM samples may be obtained from one or more of at least three locations on the drilling rig. For example, a sample may be obtained from the shale shakers (or other solids control equipment) at 124, by screening drilling fluid from an active mud pit at 126, and/or by screening drilling fluid from a return mud pit at 128. Those of ordinary skill will readily appreciate that an active mud pit is a mud pit from which drilling fluid is pumped downhole while a return mud pit is a mud pit to which drilling fluid returns after passing through the shale shakers and/or other solids control equipment after returning to the surface. Samples obtained from the shale shakers or other solids control equipment at 124 may include both cuttings particles and LCM particles as indicated at 125. Samples obtained from obtained from an active mud pit at 126 generally only include LCM particles as indicated at 127 (particularly LCM particles that have been added to drilling fluid for pumping downhole). Samples obtained from a return mud pit at 128 may not include any particles or may include LCM particles not removed by the shale shaker or other solids control equipment as indicated at 129.

Irrespective of how and where the samples are obtained, they may be prepared for image analysis at 130, for example, by washing and then drying in an oven. In certain embodiments, such as when samples are obtained from the shake shakers or solids control equipment, the sample preparation may also include sieving or meshing the cuttings and LCM particles to remove large and/or small particles (e.g., to remove a portion of the cuttings particles). The particles may be further placed in a tray having a high contrast (vivid) background color to enhance subsequent particle identification and segmentation in the acquired images, for example, pure magenta (e.g., with RGB values of 255, 0, 255), pure blue (e.g., with RGB values of 0, 0, 255), pure green (e.g., with RGB values of 0, 255, 0), and so forth. In general, such colors do not exist in nature and, accordingly, help instance segmentation models avoid detecting the background of the tray as part of the particle. The tray of prepared particles may be placed in front of a digital camera and at least one digital image may be taken at 132, for example, a white light image, or a first white light image and a second infrared or ultraviolet image, or even a first white light image, a second infrared image, and a third ultraviolet image. The disclosed embodiments are not limited in these regards; however, it will be appreciated that the acquisition of multiple images may be advantageous in that certain texture features may be more readily discerned in infrared or ultraviolet light than in white light.

In certain embodiments, the image acquisition process may advantageously make use of standardized and/or calibrated lighting, color enhancement, magnification, and/or focus/resolution settings. For example, in certain embodiments, color/illumination calibration is obtained by using colorimetry algorithms against previously analyzed photos and a current photo of interest, while resolution calibration may be based on lens focal length, focal distance, and sensor size/resolution for the current photo of interest as compared to that of previously analyzed photos. Images may be taken when the cuttings are wet or dry, with the humidity generally being controlled for dry cuttings images.

With reference again to FIG. 2, in example embodiments, the segmenting algorithm may employ a Mask Region-Based Convolutional Neural Network (Mask R-CNN) such as disclosed in U.S. patent application Ser. No. 17/647,407, which is incorporated by reference herein in its entirety. The Mask R-CNN may be configured to identify various objects (such as individual cuttings and solid additive particles) in the digital images and thereby generate the segmented image at 104. The Mask R-CNN may produce, for example, bounding boxes and mask images. The bounding boxes may be defined as a set of x-y coordinates in an image that indicates an image region that contains an object of interest. The bounding box may include a confidence score that ranges from 0 to 1 (e.g., with greater values indicating higher confidence regarding) for each object of interest. The mask image may indicate (e.g., highlight or otherwise bound) regions of interest that have a confidence score that exceeds a threshold.

It will be appreciated that Mask R-CNN is a model architecture that falls in the supervised learning category, meaning that it requires a training dataset that consists of images and corresponding labels. For example, the model may be trained using images containing solid additive particles of various sizes, shapes, colors, and types. The model may be further trained with images containing rock cuttings of various sizes, shapes, colors, and types (lithologies). Model training may also include using training images containing both LCM and rock cuttings. It will be further appreciated that the R-CNN model may be continuously retrained during a drilling operation. For example, segmentation errors may be identified and corrected and then used to generate labeled training images that may be used to retrain (or further train) the R-CNN.

Figure 4A:
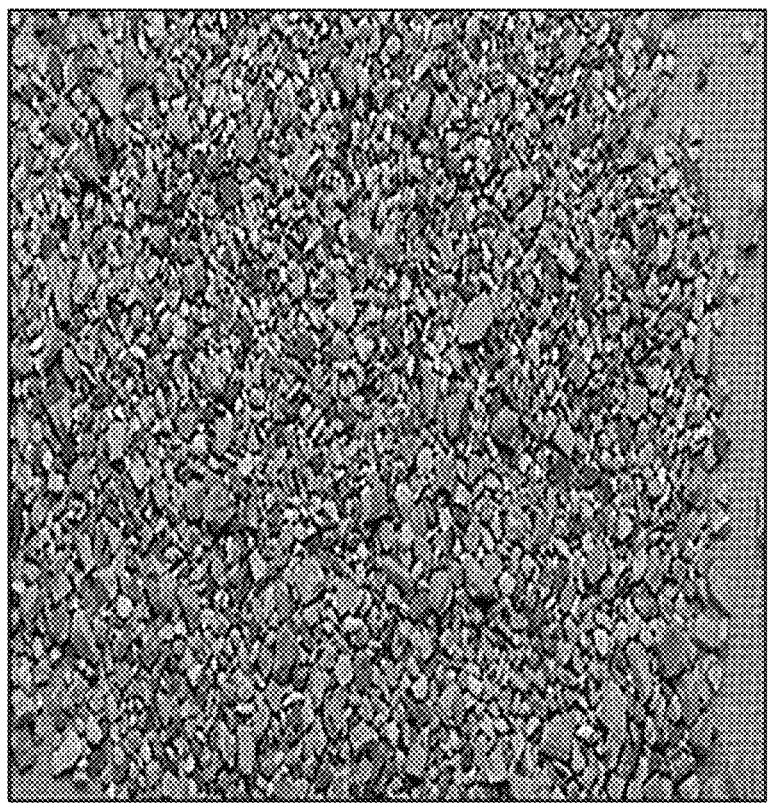
FIGS. 4A and 4B (collectively FIG. 4) depict an example digital image including both cuttings and LCM particles (4A) and a corresponding segmented image (4B).
Figure 4B:
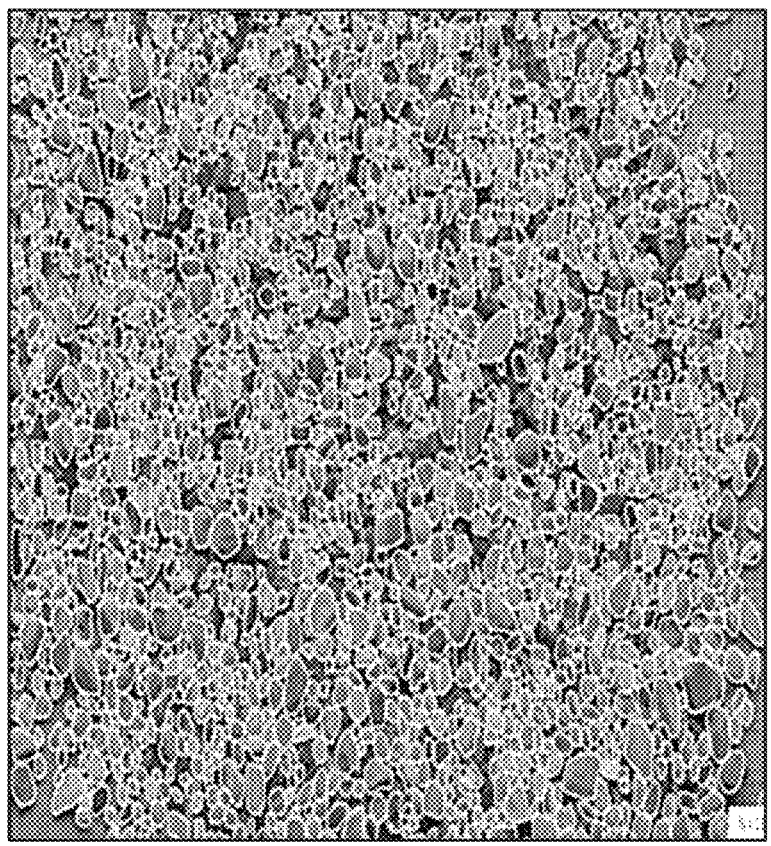

Turning now to FIGS. 4A and 4B (collectively FIG. 4), an acquired image (4A) and a corresponding segmented image (4B) are depicted. In FIG. 4A, the depicted image includes a mixture of rock cuttings and LCM particles (including 12.5 weight percent LCM particles in this example). In this example, the cuttings are of a shale lithology while the LCM particles are of a nut plug type. In the segmented image shown on FIG. 4B, a plurality of individual cuttings and LCM particles are identified and outlined as depicted (although other methods of particle demarcation may be employed). Moreover, each identified particle may be identified by a corresponding set of pixels in the image. Stated another way the segmented image may include a pixel-by-pixel segmentation in which each pixel in the image is assigned to the background or to a single individual particle.

Figure 5:
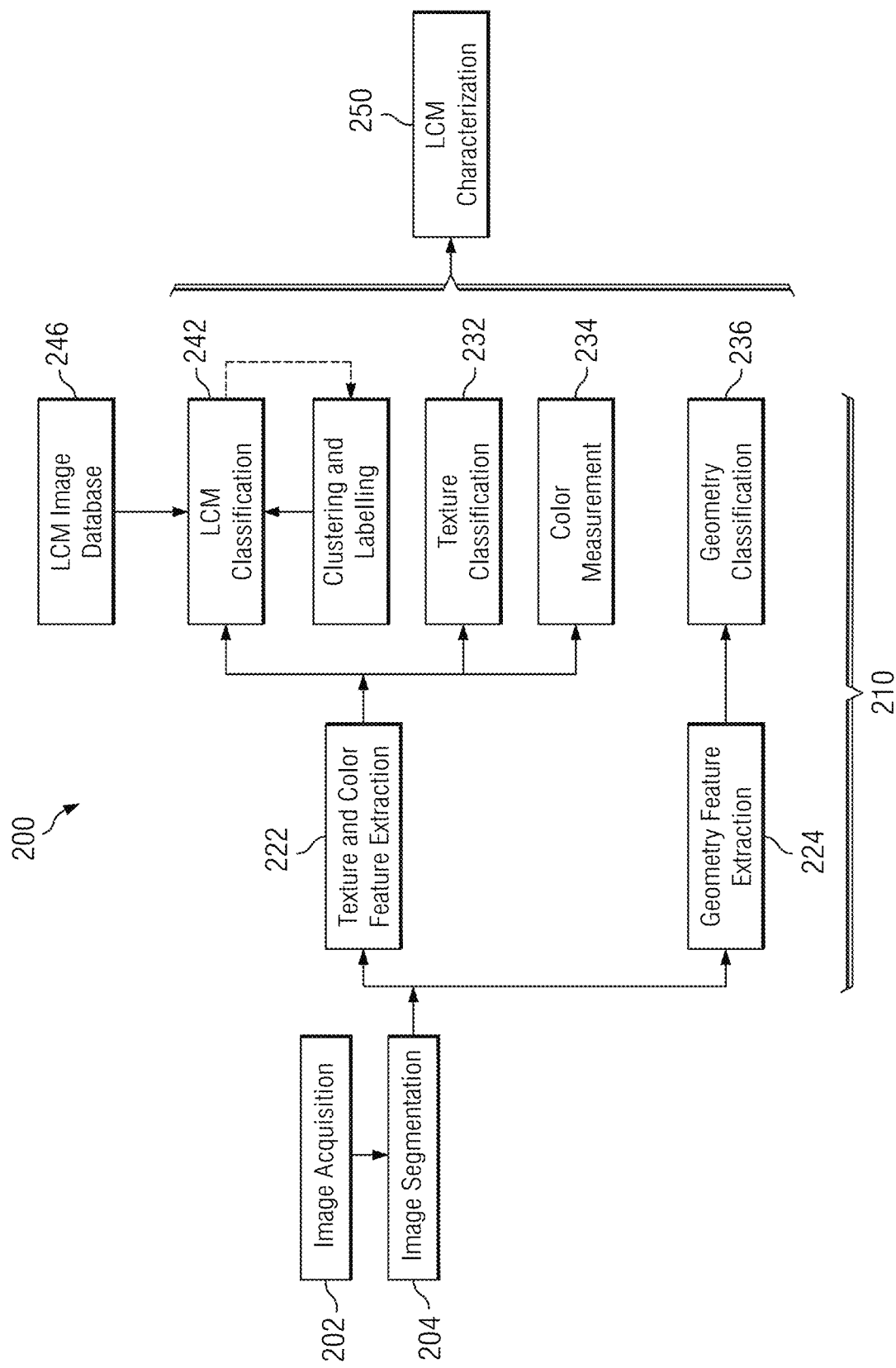
FIG. 5 depicts a flow chart of another example method for automatically characterizing LCM in drilling fluid.

FIG. 5 depicts a block diagram of an example system 200 for characterizing LCM in drilling fluid (e.g., automatically characterizing LCM in the drilling fluid). The system 200 includes a digital camera system 202 configured to take one or more calibrated digital images of solid particles as described above with respect to FIGS. 2 and 3. The digital camera system may include substantially any suitable digital camera (or cameras) sensitive to infrared, visible, and/or ultraviolet light. The system 200 may further include a segmenting module 204 configured to process a calibrated digital image to obtain a segmented image including segmented LCM particles as described above with respect to FIGS. 2 and 4. An LCM identification module 210 is configured to identify and classify LCM particles in a segmented image. The LCM identification module 210 may be configured, for example, to extract color and texture features from the segmented image to distinguish LCM particles from cuttings particles and to optionally further classifies the LCM particles into distinct groups (e.g., to distinguish a first type or kind of LCM particle from a second type or kind of LCM particle).

The LCM identification module 210 may include a color and texture feature extraction module 222 and a geometry feature extraction module 224 that may be configured to extract and evaluate color related features, texture related features, and shape and size related features of each of the individual particles. The color and texture feature extraction module 222 may be configured, for example, to extract average (such as mean, median, or mode) red, green, and blue intensities or distributions of or standard deviations of red, green, and blue intensities and/or an average luminance of each particle. The color and texture feature extraction module 222 may be further configured to extract a histogram, a variance, a skewness, and/or a kurtosis of the red, green, and blue intensities. Moreover, for infrared and/or ultraviolet images, the color related features may include average (such as mean, median, or mode) infrared and/or ultraviolet intensities or distributions of or standard deviations of infrared and/or ultraviolet intensities and/or an average infrared or ultraviolet luminance of each particle. The color related features may further include a histogram, a variance, a skewness, and/or a kurtosis of the infrared and/or ultraviolet intensities. The extracted color features may be evaluated by a color measurement module at 234 to provide a description or classification of the particle color.

The color and texture feature extraction module 222 may be further configured, for example, to extract texture related features that quantify spatial relationships and/or directional changes in pixel color and/or brightness in each particle. Extracted texture related features may include, for example, edge detection, pixel to pixel contrast, correlation, and/or entropy. In addition, in certain embodiments, texture related features may be extracted with techniques such as image texture filters (e.g., Gabor filters, and so forth), an autoencoder, or other deep learning based techniques. Moreover, directional changes may be evaluated, for example, for symmetry and used to generate spectra that may be further compared with reference spectra to assign a texture classification to each particle via texture classification module 232, which may be configured to classify each particle as homogeneous, heterogeneous, grainy, laminate, etc.

The geometry feature extraction module 224 may be configured, for example, to extract shape and size related features of each particle. The shape and size related features may include, for example, a particle diameter, an area, a perimeter, a maximum axis, a minimum axis, a particle aspect ratio, and internal angle measurements. Moreover, the geometry feature extraction module 224 may be configured to evaluate spatial relationships of the pixels grouped in each particle to extract particle circularity, solidity, elongation, roundness, and/or convex hull area. A geometry classification module 236 may be configured to evaluate the shape and size related features and to further classify the individual particles. For example, individual particles may be classified as being a plate, a fiber, circular or oval particulate, sharp angled particulate, etc. as well as being classified in one of various size bins (e.g., based on the diameter, cross sectional area, and/or perimeter of the particle).

An LCM classification module 242 may be configured to evaluate the extracted color and texture features to distinguish between LCM particles and cuttings particles and to further classify the LCM particles according to particle type or kind. For example, the LCM particles may be classified as flake (such as shredded paper, mica, etc.), general particulates (such as nut plugs, calcite, etc.), fibrous (such as cellulose, nylon, etc.), dark particulates (such as petroleum coke, lignosulphonates, etc.), and UV reactive (such as polymeric beads, calcite, etc.). Particles identified as cuttings may be labeled as such and optionally removed from further LCM classification.

It will be appreciated that LCM classification module 242 may include a trained machine learning algorithm or any other deep learning algorithm. The module 242 may be trained using extracted color and texture features of different LCM particle types (obtained from segmented images as described above). The module 242 may make use of an LCM image database 246 including visible, infrared, and/or ultraviolet images. Such a database may be maintained on-site (e.g., at the rig location) or off-site (e.g., at an off-site processing center or other location).

The LCM particles may be identified by the LCM classification module 242, for example, according to a location of the particle in a multi-dimensional space of extracted color and texture features. For example, as described above, a set of color and texture features may be computed (e.g., for each of the selected cuttings and/or LCM particles). The set of computed color and texture features may include a large number of features, for example, including at least 16 features (e.g., at least 32, 48, 64, 80, 96, 112, or 128 color and texture features).

The particle may then be classified according values of those features, for example, that cause like particles to cluster in the aforementioned multi-dimensional feature space. The particle may alternatively (and/or additionally) be classified based on a nearest neighbor classification of the particle in the multi-dimensional space of extracted color and texture features. In example embodiments a classification (e.g., LCM particle type) of each of the particles may be assigned based on the clustering. In such an embodiment, groups of particles located in the same cluster (or local region of the hyperspace) may be assigned the same classification. In still further example embodiments, the particle may be classified using a neural network (NN) that is trained based on a set of extracted color and texture features. One example classification methodology is described in more detail below by way of example for a simplified two-dimensional feature space. It will be appreciated that in practice the classification generally makes use of a larger number of extracted color and texture features (e.g., up to 16 or more features defining a multi-dimensional feature space).

It will be understood that from time to time, the LCM classification module 242 may mislabel one or more segmented particles or fail to identify any appropriate category for a segmented particle. In such instances, the particle(s) may be further evaluating using a clustering and labeling module 244 that is configured, for example, to enable a human operator to manually label the particle(s). The re-labeled image (including the labeled particles) may then be used to further train (or retrain) the LCM classification module 242.

With continued reference to FIG. 5, an LCM characterization module 250 may be configured to receive the LCM classification and to summarize the makeup of the LCM in the drilling fluid. For example, the LCM characterization module 250 may be configured to output the relative amounts of each type of LCM in the drilling fluid (e.g., a first percentage of a first LCM type and a second percentage of a second LCM type). The LCM characterization module 250 may be further configured to process the texture classification, the color classification, and the shape and size classification to further describe and summarize the features of each of the classified LCM types. In such embodiments, the LCM characterization module 250 may provide a listing of the relative amounts of each type of LCM in the drilling fluid along with an average and distribution of color and texture features of each LCM type. The LCM characterization module 250 may be further configured to compare the average and distribution of features of each LCM type with corresponding known features of the LCM prior to use in the drilling operation. In this way degradation (or change) of the LCM may be automatically monitored while drilling.

The LCM characterization module 250 may be further configured to estimate a quantity of LCM in the drilling fluid. For example, the LCM characterization module 250 may be configured to count the number of LCM particles in the image and to compute the number of LCM particles per unit volume of drilling fluid, for example, by dividing the number of LCM particles in the image by a drilling fluid volume corresponding to the image. In example embodiments, the drilling fluid volume may be obtained by multiplying the drilling fluid flow rate by an elapsed time required to collect the particles in the image.

In other example embodiments, the LCM characterization module 250 may be configured to count the number of cuttings particles and the number of LCM particles in the image or to estimate the volume of cuttings particles and the volume of LCM particles in the image (e.g., from the diameter or cross sectional area of each of the cuttings and LCM particles). The LCM characterization module 250 may be further configured to estimate the mass of cuttings particles and the mass of LCM particles in the image (e.g., from the estimated volumes and densities of the cuttings and LCM particles).

In one example embodiment, the LCM characterization module 250 may be configured to estimate a number of LCM particles per unit volume of drilling fluid from the number of LCM particles in the image and the volume of cuttings in the image. For example, the number of LCM particles per unit volume of drilling fluid may be computed by dividing the number of LCM particles in the image by the volume of cuttings in the image and them multiplying by a ratio of volume rate of penetration of drilling (the rate of penetration of drilling times the cross-sectional area of the wellbore) to the drilling fluid flow rate as shown in the following equation:

$$C_{LCM} = \frac{N_{LCM}}{V_{cuttings}} \cdot \frac{V_{ROP}}{\text{Flow}}$$

where $C_{LCM}$ represents the number of LCM particles per unit volume of drilling fluid, $N_{LCM}$ represents the number of LCM particles in the image, $V_{cuttings}$ represents the volume of cuttings in the image, $V_{ROP}$ represents the volume rate of penetration (the rate of penetration times the cross sectional area of the drill bit), and Flow represents the drilling fluid flow rate.

Figure 6A:
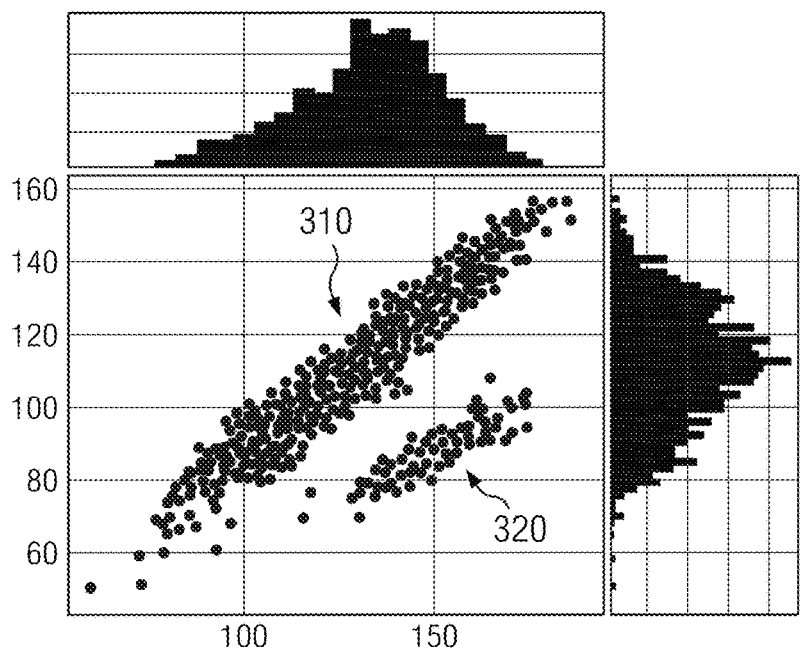
FIGS. 6A and 6B (collectively FIG. 6) depict an example segmented image (6A) and corresponding two-dimensional cross plot (6B) distinguishing cuttings particles from LCM nut plug particles.
Figure 6B:
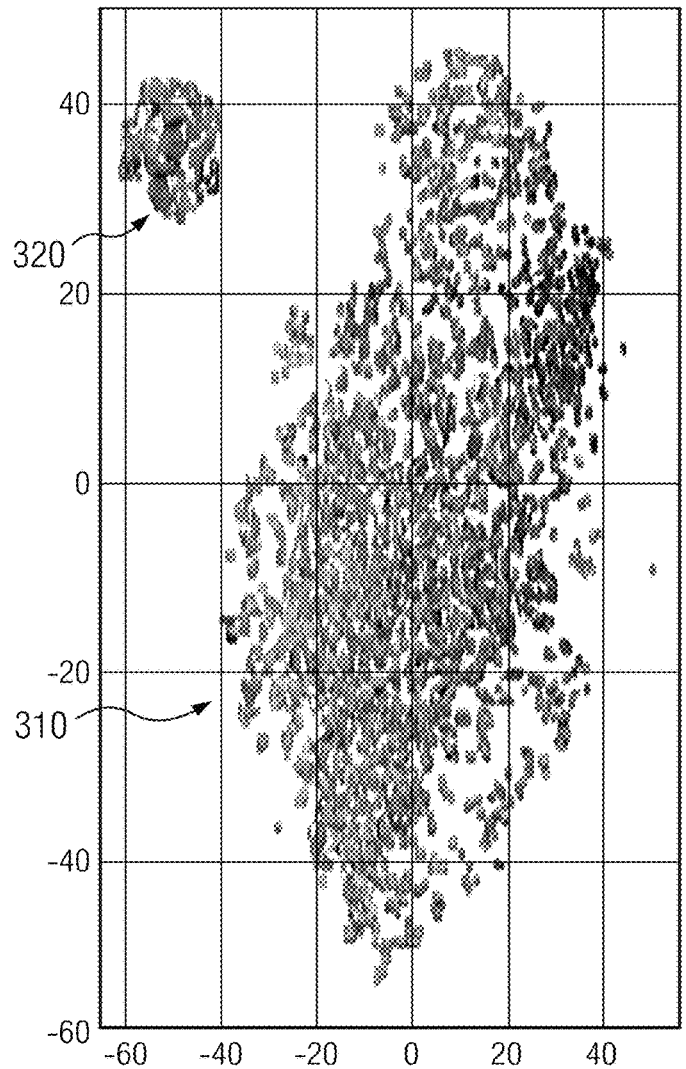

FIGS. 6A and 6B (collectively FIG. 6) depict first and second cross plots that distinguish cuttings particles from LCM particles. The cross plots were generated from the segmented image depicted on FIG. 4B, which was generated from an image obtained from a sample including 12.5 weight percent nut plug LCM particles mixed with shale-like cuttings particles. As described above, the segmented image (4B) was obtained using a Mask R-CNN segmenting algorithm. The segmented image was evaluated to extract 64 distinct color and texture features, thereby defining a 64-dimension feature space. The disclosed embodiments are, of course, not limited in this regard and may extract more or less include more or less color and texture features (e.g., 16, 24, 32, 48, 80, 96, 112, 128, and the like). The cross plot depicted on FIG. 6A depicts a plot of mean particle blue intensity versus mean particle red intensity. Note that the cuttings particles 310 are clearly distinguishable from the nut plug LCM particles 320 indicating that in this example the cuttings particles and LCM particles can be distinguished solely from color related features. The cross plot depicted on FIG. 6B was obtained by compressing the 64 distinct color and texture features to a two dimensional cross plot (in which each dimension was related to both color and texture features) using t-distributed Stochastic Neighbor Embedding (t-SNE) to illustrate that the cuttings particles and LCM particles may be distinguished in a multi-dimensional color and texture feature space. Note that the LCM particles are clearly distinguished from the cuttings particles as indicated collectively at 310 and 320.

Figure 7A:
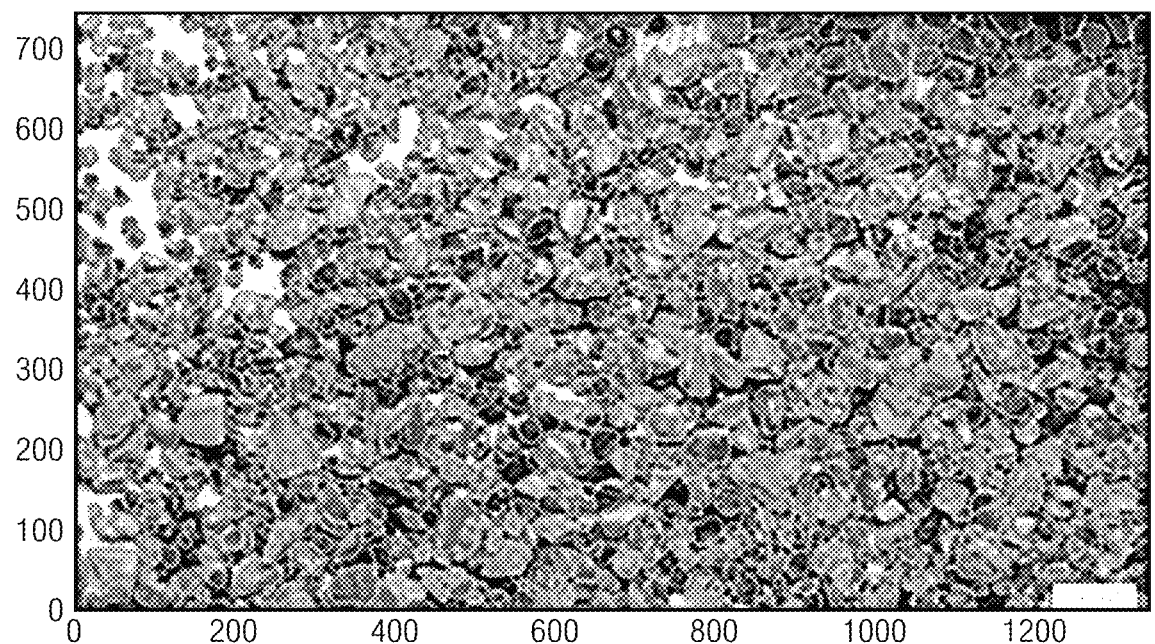
FIGS. 7A and 7B (collectively FIG. 7) depict an example segmented image (7A) and corresponding two-dimensional cross plot (7B) distinguishing cuttings particles from first and second LCM particles.
Figure 7B:
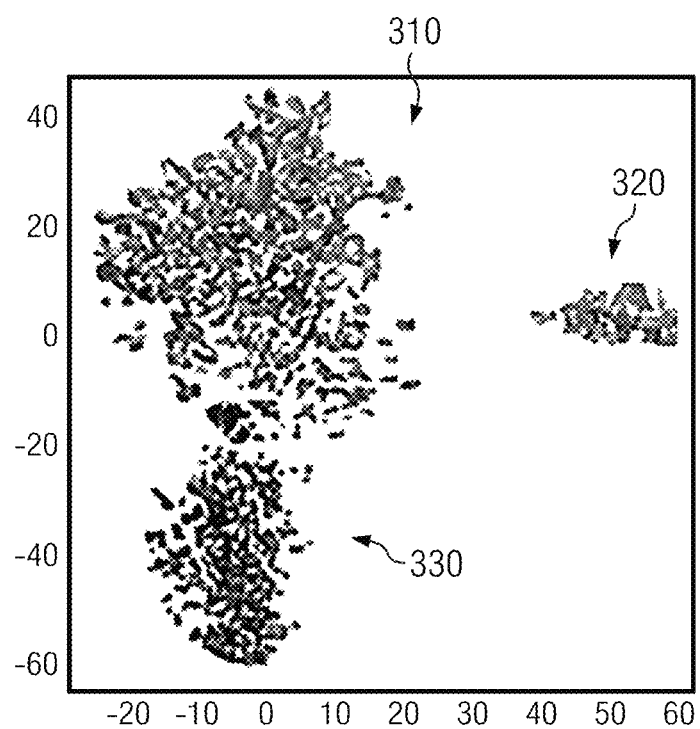

FIGS. 7A and 7B (collectively FIG. 7) depict another example segmented image (7A) and corresponding two-dimensional cross plot (7B) distinguishing cuttings particles 310, from first and second LCM particles 320 and 330. The original image (not shown) includes 12.5 weight percent nut plug first LCM particles and 12.5 weight percent petroleum coke second LCM particles mixed with shale-like cuttings particles. The segmented image (7A) was obtained using the Mask R-CNN segmenting algorithm described above. The segmented image was evaluated to extract 64 distinct color and texture features, thereby defining a 64-dimension feature space. The disclosed embodiments are, of course, not limited in this regard and may extract more or less color and texture features as noted above. In the example embodiment depicted, the 64 distinct color and texture features were compressed to a two dimensional cross plot (in which each dimension was related to color and texture features) using t-distributed Stochastic Neighbor Embedding (t-SNE) to illustrate that the cuttings particles, the first LCM particles, and the second LCM particles may be distinguished in a multi-dimensional color and texture feature space. Note that the LCM particles are clearly distinguished from the cuttings particles as indicated collectively at 310, 320, and 330. While this example includes both cuttings particles and LCM particles, it will be appreciated that the same methodology may be applied to samples including only LCM particles and that different LCM particles may be distinguished and characterized whether or not the samples (and images) including cuttings particles.

It will be understood that the present disclosure includes numerous embodiments. These embodiments include, but are not limited to, the following embodiments.

In a first embodiment, a method for evaluating lost cuttings materials (LCM) in drilling fluid includes acquiring a calibrated digital image of solid particles separated from the drilling fluid, the solid particles including at least LCM particles; processing the calibrated digital image to generate a segmented image that identifies individual ones of the solid particles depicted in the image; extracting color features or texture features from the identified solid particles depicted in the segmented image; processing the extracted color features or texture features to identify LCM particles among the identified solid particles and to classify each of the identified LCM particles into one of a plurality of LCM classes and thereby obtain an LCM particle classification; and processing the LCM classification to generate a consolidated summary.

A second embodiment may include the first embodiment wherein the processing the calibrated digital image, the extracting color features or texture features, the processing the extracted color features or texture features, and the processing the LCM classification are performed automatically.

A third embodiment may include any one of the first through second embodiments, wherein the acquiring the calibrated digital image comprises drilling a subterranean wellbore; collecting the solid particles from the circulating drilling fluid; preparing the solid particles; and taking a calibrated digital image of the prepared solid particles.

A fourth embodiment may include any one of the first through third embodiments, wherein the solid particles comprise a mixture of cuttings particles and the LCM particles; and the identified solid particles in the segmented image include both the cuttings particles and the LCM particles.

A fifth embodiment may include the fourth embodiment, wherein the processing the extracted color features or texture features to identify LCM particles comprises distinguishing the LCM particles from the cuttings particles.

A sixth embodiment may include any one of the first through fifth embodiments, wherein the processing the LCM classification comprises computing a relative amount of LCM particles in each of the plurality of LCM classes.

A seventh embodiment may include any one of the first through sixth embodiments, wherein the processing the LCM classification further comprises evaluating a number of LCM particles in at least one of the classes to estimate a concentration of the LCM particles in the drilling fluid.

An eighth embodiment may include the seventh embodiment, wherein the processing the LCM classification further comprises evaluating a number of LCM particles in at least one of the classes, an area or a volume of cuttings in the digital image, a rate of penetration while drilling, and a drilling fluid flow rate to estimate a concentration of the LCM particles in the drilling fluid.

A ninth embodiment may include the seventh embodiment, wherein the processing the LCM classification further comprises evaluating a number of LCM particles in at least one of the classes to estimate a concentration of the LCM particles in the drilling fluid, comparing the concentration of the LCM particles in the drilling fluid with a desired concentration, and presenting the comparison.

A tenth embodiment may include any one of the first through ninth embodiments, wherein the processing the extracted color features or texture features comprises determining a location of each of the identified solid particles in a multi-dimensional color and texture feature space and classifying the LCM particles based on the location of each of the LCM particles in the multi-dimensional color and texture feature space.

An eleventh embodiment may include any one of the first through tenth embodiments, wherein the processing the extracted color features or texture features to identify LCM particles uses a neural network.

A twelfth embodiment may include the eleventh embodiment, further comprising relabeling the segmented image to corrected misclassified LCM particles; and using the relabeled image to train the neural network.

In a thirteenth embodiment, a method for evaluating lost cuttings materials (LCM) in drilling fluid circulating in a wellbore includes acquiring a calibrated digital image of solid particles separated from drilling fluid circulating in a wellbore, the solid particles including at least LCM particles; processing the calibrated digital image to generate a segmented image that identifies individual ones of the solid particles depicted in the image; extracting color features or texture features from each of the identified solid particles depicted in the segmented image; processing the extracted color features or texture features to distinguish LCM particles from among the identified solid particles; computing a number of the distinguished LCM particles in the segmented image; and evaluating the number of distinguished LCM particles to estimate a concentration of the LCM particles in the drilling fluid.

A fourteenth embodiment may include the thirteenth embodiment, wherein the processing the extracted color features or texture features further comprises distinguishing cuttings particles from among the identified solid particles; the computing further comprises computing an area or a volume of the distinguished cuttings particles; and the evaluating further comprises evaluating the number of the distinguished LCM particles and the area or a volume of the distinguished cuttings particles to estimate a concentration of the LCM particles in the drilling fluid.

A fifteenth embodiment may include any one of the thirteenth through fourteenth embodiments, further comprising comparing the concentration of the LCM particles in the drilling fluid with a desired concentration; and adjusting a concentration of the LCM particles in the drilling fluid based on the comparison.

In a sixteenth embodiment, a system for evaluating lost cuttings materials (LCM) in drilling fluid circulating in a wellbore includes a digital camera system configured to take a calibrated digital image of solid particles separated from drilling fluid circulating in a wellbore, the solid particles including at least LCM particles; and a digital image processing system including a plurality of modules, the modules comprising: a segmentation module configured to process the calibrated digital image to identify individual ones of the solid particles depicted in the image; a color and texture feature extraction module configured to extract color features or texture features from each of the identified solid particles depicted in the image; an LCM classification module configured to process the extracted color features or texture features to identify LCM particles among the identified solid particles and to classify each of the identified LCM particles into one of a plurality of LCM classes and thereby obtain an LCM particle classification; and a consolidation module configured to process the LCM classification to generate and output and a consolidated summary.

A seventeenth embodiment may include the sixteenth embodiment, wherein the segmentation module comprises a Mask Region-Based Convolutional Neural Network.

An eighteenth embodiment may include any one of the sixteenth through seventeenth embodiments, wherein the LCM classification module configured is configured to process the extracted color features or texture features to distinguish the LCM particles from cuttings particles in the segmented image.

A nineteenth embodiment may include any one of the sixteenth through eighteenth embodiments, wherein the consolidation module is configured to process the LCM classification to compute a relative amount of the LCM particles in each of the plurality of LCM classes.

A twentieth embodiment may include any one of the sixteenth through nineteenth embodiments, wherein the consolidation module is configured to process the LCM classification to evaluate a number the LCM particles in at least one of the classes to estimate a concentration of the LCM particles in the drilling fluid.

Although automated identification and quantification of solid drilling fluid additives has been described in detail, it should be understood that various changes, substitutions and alternations can be made herein without departing from the spirit and scope of the disclosure as defined by the appended claims.

The invention claimed is:

1. A method for evaluating lost circulation materials (LCM) in drilling fluid, the method comprising:
acquiring a calibrated digital image of solid particles separated from the drilling fluid, the solid particles including at least cuttings and LCM particles, and the LCM particles comprising material added to the drilling fluid to seal one or more drilling fluid loss regions in a wellbore to prevent the drilling fluid from flowing into a formation through the one or more drilling fluid loss regions;
processing the calibrated digital image to generate a segmented image that identifies individual ones of the cuttings and LCM particles in the calibrated digital image, wherein the generating the segmented image comprises assigning each pixel in the calibrated digital image to background or to one of the solid particles;
extracting a plurality of color features and texture features from each of the individual cuttings and LCM particles identified in the segmented image, a total number of the plurality of color features and texture features defining a feature space having the number of dimensions;
processing the extracted plurality of color features and texture features, wherein the processing the extracted plurality of color features and texture features includes classifying each of the individual cuttings as cuttings and each of the individual LCM particles as one of a plurality of LCM types based on groupings of one or more common features associated with the plurality of LCM types; and
generating a consolidated summary based on the classification of the cuttings and LCM particles.

2. The method of any one of claim 1, wherein the acquiring the calibrated digital image comprises:
drilling a subterranean wellbore;
circulating the drilling fluid in the subterranean wellbore;
collecting the solid particles from the circulating drilling fluid;
preparing the solid particles; and
taking a calibrated digital image of the prepared solid particles.

3. The method of claim 1, further comprising computing a relative amount of the cuttings and a relative amount of the LCM particles of each of the plurality of LCM types, wherein the relative amounts include total numbers of the cuttings and of the LCM particles of each of the plurality of LCM types, concentrations of the cuttings and of the LCM particles of each of the plurality of LCM types, and wherein the consolidated summary includes the relative amounts.

4. The method of claim 3, wherein the computing the concentrations of the cuttings and of the LCM particles of each of the plurality of LCM types comprises, for each LCM type, evaluating the total numbers of the cuttings and of the LCM particles of the LCM type, an area or a volume of the cuttings, a volume rate of penetration while drilling, and a drilling fluid flow rate.

5. The method of claim 3, further comprising comparing the concentrations of the LCM particles of the plurality of LCM types in the drilling fluid with a desired concentration, wherein the consolidated summary includes the comparison.

6. The method of claim 1, further comprising determining a location of each of the cuttings and LCM particles in the feature space, wherein the classifying the individual cuttings and the individual LCM particles is based on the location of each of the individual cuttings and LCM particles in the feature space.

7. The method of claim 1, wherein the classifying uses a neural network.

8. The method of claim 7, further comprising:
relabeling the segmented image to corrected misclassified LCM particles; and using the relabeled digital image to train the neural network.

9. An apparatus for evaluating lost circulation materials (LCM) in drilling fluid circulating in a wellbore, the apparatus comprising:
   means for acquiring a calibrated digital image of solid particles separated from drilling fluid circulating in a wellbore, the solid particles including at least cuttings and LCM particles, and the LCM particles comprising material added to the drilling fluid to seal one or more drilling fluid loss regions in a wellbore to prevent the drilling fluid from flowing into a formation through the one or more drilling fluid loss regions;
   means for processing the calibrated digital image to generate a segmented image that identifies individual ones of the cuttings and LCM particles in the calibrated digital image, wherein the generating the segmented image comprises assigning each pixel in the calibrated digital image to background or to one of the solid particles;
   means for extracting a plurality of color features and texture features from each of the individual cuttings and LCM particles identified in the segmented image, a total number of the plurality of color features and textures features defining a feature space having the number of dimensions;
   means for processing the extracted plurality of color features and texture features, wherein the processing the extracted plurality of color features and texture features includes classifying each of the individual cuttings as cuttings and each of the individual LCM particles as one of a plurality of LCM types based on groupings one or more common features associated with the plurality of LCM types; and
   means for generating a consolidated summary based on the classification of the cuttings and LCM particles.

10. The apparatus of claim 9, further comprising, for each of the plurality of LCM types:
    means for computing an area or a volume of the cuttings and of the LCM particles;
    means for evaluating a total number of the cuttings and of the LCM particles of the LCM type, an area or a volume of the cuttings, a volume rate of penetration while drilling, and a drilling fluid flow rate; and
    means for estimating, based on the evaluation, a concentration of the LCM particles of the LCM type in the drilling fluid.

11. The apparatus of claim 10, further comprising:
    means for comparing the estimated concentrations of the LCM particles in the drilling fluid with a desired concentration; and
    means for adjusting the concentration of the LCM particles in the drilling fluid based on the comparison.

12. A system for evaluating lost circulation materials (LCM) in drilling fluid circulating in a wellbore, the system comprising:
    a digital camera configured to take a calibrated digital image of solid particles separated from drilling fluid circulating in a wellbore, the solid particles including at least cuttings and LCM particles, and the LCM particles comprising material added to the drilling fluid to seal one or more drilling fluid loss regions in a wellbore to prevent the drilling fluid from flowing into a formation through the one or more drilling fluid loss regions; and
    one or more processors configured to:
        generate a segmented image that identifies individual ones of the cuttings and LCM particles in the calibrated digital image, wherein the generating the segmented image comprises assigning each pixel in the calibrated digital image to background or to one of the solid particles;
        extract a plurality of color features and texture features from each of the individual cuttings and LCM particles identified in the segmented image, a total number of the plurality of color features and textures features defining a feature space having the number of dimensions;
        process the extracted plurality of color features and texture features, wherein the LCM classification module is configured to classify each of the individual cuttings as cuttings and each of the individual LCM particles as one of a plurality of LCM types based on groupings of one or more common features associated with the plurality of LCM types;
        output a consolidated summary based on the classification of the cuttings and LCM particles; and
        output information associated with the consolidated summary.

13. The system of claim 12, wherein the generating the segmented image uses a Mask Region-Based Convolutional Neural Network.

14. The system of claim 12, further comprising computing a relative amount of the LCM particles of each of the plurality of LCM types, wherein the consolidated summary includes the relative amounts of the LCM particles of the plurality of LCM types.

15. The system of claim 12, further comprising evaluating a number the LCM particles of at least one of the plurality of LCM types to estimate a concentration of the LCM particles in the drilling fluid.

16. The method of claim 1, wherein the LCM types comprise at least one of: ground nut shells, mica, petroleum cake, shredded paper, polymeric beads, calcite, or cellulose.

17. The method of claim 1, further comprising:
    compressing the feature space to two dimensions; and
    outputting information associated with the consolidated summary in the compressed two-dimensional feature space.

18. The method of claim 1, further comprising extracting at least one of: shape features or size features of the individual cuttings and LCM particles, wherein:
    the shape features or size features comprise at least one of: a diameter, an area, a perimeter, a maximum axis, a minimum axis, an aspect ratio, an angle, a circularity, a solidity, an elongation, a roundness, or a convex hull area, of the individual cuttings and LCM particles; and
    the classifying includes, based on the extracted plurality of shape features or size features, classifying the individual cuttings and LCM particles as a plate, as a fiber, as a circular particulate, as an oval particulate, as a sharp angled particular, or into a size bin.

19. The method of claim 1, wherein:
    the plurality of color features comprises at least one of: an average color intensity, a mean color intensity, a median color intensity, a mode color intensity, an average luminance, a mean luminance, a median luminance, a mode luminance; a histogram of color intensity, a variance of color intensity, a skewness of color intensity, or a kurtosis of color intensity;
    the classifying includes, based on the extracted plurality of color features, classifying the individual cuttings and LCM particles as flakes, general particulates, fibrous particulates; dark particulates, or ultraviolet reactive particulates;

the plurality of texture features comprises at least one of: edge detection, pixel to pixel contrast, correlation, or entropy; and the classifying includes, based on the extracted plurality of texture features, classifying the individual cuttings and LCM particles as homogeneous, heterogeneous, grainy, or laminate.

20. The method of claim 1, wherein the classifying is based on a nearest neighbor classification in the feature space or a cluster location of the LCM particle in the feature space.

\* \* \* \* \*